(12) United States Patent
McMullin

(10) Patent No.: US 6,820,573 B1
(45) Date of Patent: Nov. 23, 2004

(54) PET CAROUSEL

(76) Inventor: John P McMullin, 101 S. St., unit # 13, Danbury, CT (US) 06810

( * ) Notice: Subject to any disclaimer, the term of this patent is extended or adjusted under 35 U.S.C. 154(b) by 0 days.

(21) Appl. No.: 10/355,923

(22) Filed: Jan. 31, 2003

(51) Int. Cl.[7] ................................................ A01K 1/04
(52) U.S. Cl. ...................................... 119/791; 119/786
(58) Field of Search ................................ 119/791, 786, 119/780, 783, 784, 787, 788, 789; 248/545, 530, 156, 125.1, 125.3, 125.8

(56) References Cited

U.S. PATENT DOCUMENTS

| | | | | |
|---|---|---|---|---|
| 417,617 A | * | 12/1889 | Williams | 119/788 |
| 429,111 A | | 6/1890 | Bailey | |
| 484,377 A | | 10/1892 | Robinson | |
| 606,922 A | * | 7/1898 | Gates | 119/783 |
| 1,465,806 A | * | 8/1923 | Chester | 119/786 |
| 1,699,308 A | | 1/1929 | Postings | |
| 1,700,224 A | | 1/1929 | Henderson | |
| 2,080,653 A | * | 5/1937 | Craft | 473/143 |
| 2,437,786 A | | 3/1948 | Oberdorf et al. | |
| 2,790,419 A | * | 4/1957 | Sullivan | 119/786 |
| 3,123,052 A | | 3/1964 | Marshall | |
| 3,189,004 A | | 6/1965 | Sinclair | |
| 3,896,769 A | * | 7/1975 | McGehee | 119/786 |
| 3,952,878 A | * | 4/1976 | Gorham | 211/64 |
| 4,796,566 A | | 1/1989 | Daniels | |
| 5,022,351 A | | 6/1991 | Daniels | |
| 5,353,747 A | | 10/1994 | Fain | |
| 5,502,910 A | * | 4/1996 | Lucchesi | 40/607.06 |
| 5,526,774 A | | 6/1996 | Swindall, Jr. et al. | |
| 5,732,659 A | * | 3/1998 | Wiggins | 119/787 |
| 6,318,302 B1 | * | 11/2001 | Bedient | 119/786 |
| 6,481,364 B2 | * | 11/2002 | Woyjeck | 114/294 |
| 6,612,263 B2 | * | 9/2003 | Scheid et al. | 119/787 |
| 2003/0205647 A1 | * | 11/2003 | Boucher | 248/156 |

* cited by examiner

Primary Examiner—Robert P. Swiatek
Assistant Examiner—Joan M. Olszewski
(74) Attorney, Agent, or Firm—Michael I Kroll

(57) ABSTRACT

The present invention includes an adjustable and collapsible pole structure having a telescoping inner and outer pipe providing an adjustable pole length. The outer pipe is crimped for hammering into the ground and the inner pipe receives a carousel member for rotation about the pole proximate the inner pipe top end. Two carousel extensions are spaced for receiving the grip portion of a typical retractable pet leash, the extension also being adapted to accommodate an insertion member that secures the pet leash within the carousel extensions. The insertion member can be a U-shaped member with elongated ends received by holes in the carousel extensions and the pet leash grip, or an insertable member with holes for a pin or pins sized to prevent removal of the member from the openings in the carousel extensions and the pet leash grip A hammering pin is insertable into the top of the carousel.

12 Claims, 13 Drawing Sheets

PET CAROUSEL

BACKGROUND OF THE INVENTION

1. Field of the Invention

The present invention relates generally to animal tethers and more specifically to rotating tether devices.

2. Description of the Prior Art

There are other pet tether devices designed for tethering pets. Typical of these is U.S. Pat. No. 484,377 issued to Robison on Oct. 11, 1892.

Another patent was issued to Postings on Nov. 19, 1928 as U.S. Pat. No. 1,699,308. Yet another U.S. Pat. No. 1,700,224 was issued to Hendersen on Apr. 25, 1928 and still yet another was issued on Sep. 25, 1945 to Oberdorf et al. as U.S. Pat. No. 2,437,786.

Another patent was issued to Marshall et al on Mar. 3, 1964 as U.S. Pat. No. 3,123,052. Yet another U.S. Pat. No. 3,189,004 was issued to Sinclair on Jun. 15, 1965 and still yet another was issued on Jun. 3, 1890 to Bailey et al. as U.S. Pat. No. 333,946.

Another patent was issued to Daniels et al. on Jan. 10, 1989 as U.S. Pat. No. 4,796,566. Yet another U.S. Pat. No. 5,022,351 was issued to Daniels on Jun. 11, 1991 and still yet another was issued on Oct. 11, 1994 to Fain as U.S. Pat. No. 5,353,747. And still yet another was issued on Jun. 18, 1996 to Swindall as U.S. Pat. No. 5,526,774.

U.S. Pat. No. 484,377

Inventor: Ralph E. Robinson

Issued: Oct. 11, 1892

In a tether, the combination, with a socketed post, of a standard formed of two sections pivoted together, the upper section being apertured and the lower section seated in the socket of the post and provided with a lateral arm, a curved bar having one end secured to the said arm and its other end projecting through the aperture of the upper section of the standard, and a spring surrounding the bar, substantially as herein shown and described.

U.S. Pat. No. 1,699,308

Inventor: William G. Postings

Issued: Nov. 19, 1928

In a dog training and exercising device of the class described, a base member, adapted to pivotally receive an attaching member, said base member adapted to support an extended member, a flexible member attached to the free extremity of the said extended member, said flexible member attached to the collar of a dog, so as to permit the said dog to run around, an arm pivotally attached to the said free extremity of the said extended member, a second flexible member attached to the free extremity of the said arm, a piece of food attached to the said flexible member, so as to encourage the dog to hold his head in an erect position.

U.S. Patent Number Otto A. Hendersen

Inventor: 1,700,224

Issued: Apr. 25, 1928

A practice golf ball device, comprising a golf ball, a ground penetrating anchoring member and an elongated tether between said ball and said anchoring member and detachably connected to the latter, said tether being of a retractile spring throughout its entire length.

U.S. Pat. No. 2,437,786

Inventor: George S. Oberdorf

Issued: Sep. 25, 1945

In a tether apparatus of the class described a combination of a casing having a spike in connection therewith adapted to the forced into the ground, a shaft rotatably mounted in said casing, a spool secured in connection with said shaft, a coil spring having its inner end in connection with said shaft, a disc shaped transfer plate connected to the outer end of said coil spring, a second coil spring connected at its inner end to said transfer plate and secured at its outer end to said casting, radially disposed pegs connected to the hub of said spool intermediate the ends thereof, said casing provided with a u-shaped slotted portion in its sidewall, the legs of said u-shaped slotted portion aligned with said spool at opposite sides of said radially disposed pegs.

U.S. Pat. No. 3,123,052

Inventor: Harold E. Marshall

Issued: Mar. 3, 1964

A dog leash or the like, comprising a fixed support having a head; a casing mounted on said support for swiveling movement there around and having a lateral opening therein; a spring-biased reel in said casing; a leash passing through said opening and normally encircling said reel and having its inner end secured thereto; the outer end of the leash being adapted to be secured to an animal or the like; said reel normally rewinding said leash; means in the casing for manually adjusting the tension of the reel biasing spring to regulate the strength thereof in accordance with the strength of the leashed animal; said casing having a substantially circular casing and being provided with side walls; an axially disposed shaft carrying said reel and being freely rotatable in a bearing in one side wall; a second bearing through which said shaft extends; a sleeve around said shaft passing through said second bearing and extending beyond the end of said shaft; a relatively strong coiled rewind spring having one end secured to said casing and its other end secured to said sleeve; and said adjusting means comprising a normally engaged clutch connecting said sleeve and shaft, said clutch being manually operable to release the sleeve from the shaft for independent rotation of the sleeve to vary the tension of the rewind spring.

U.S. Pat. No. 3,189,004

Inventor: Fred Sinclair

Issued: Jun. 15, 1965

A tether for pets, other animals, or the like, comprising a ground engaging mounting socket sleeve, a pointed wooden peg with a concentric neck of reduced diameter projecting form one end of said sleeve, a tubular column rising from the other end of said sleeve and releasable locked therein, said column having a removable plug in the socket sleeve engaging end and an aperture cap closing the other end, a retractable tether line passing freely through said cap and a counterbalance weight on an end of said line housed in said column and normally slidable between said removable plug and said cap, wherein said plug houses a spring-urged radially disposed plunger and said tubular column and socket sleeve have normally registering perforations into which said plunger extends serving to normally lock said plug in said column and releasable lock said column in said socket sleeve.

U.S. Pat. No. 333,946

Inventor: Clem Bailey

Issued: Jun. 3, 1890

An animal-tether consisting of the screw portion, the rod provided with means for attachment to the animal, and a coiled spring connected at one end to the screw portion and at the other end to the rod, with an unattached portion between the points of attachment to the rod and screw portion, and an eye b between the screw and connection of the spring, substantially as and for the purpose specified.

U.S. Pat. No. 4,796,566

Inventor: Thomas Daniels

Issued: Jan. 10, 1989

The present invention teaches a portable convertible tethering system which is centered around a retractable leash cartridge. The leash cartridge may be used alone to restrain children or animals while moving about, or alternatively, the cartridge may be placed in the system's housing which is attached to an anchoring device thereby becoming an integral part of a stationary tethering device. The housing is sized and shaped specifically for securely holding a portable retractable leash cartridge inside, yet is designed for simple insertion and removal of the cartridge. The housing has a lockable door for holding the leash cartridge inside against force or agitation. The housing is pivotally mounted on the anchor device so that the end of the cartridge from which the leach cord extends may follow that which is tethered; this capability reduces the likelihood that whatever is tethered, particularly an animal such as a dog, will not likely tangle the leash cord around the base of the system's anchor. The system's two-fold use of the retractable leash cartridge provides a user with the most economical avenue for having effective and convenient devices for both mobile and stationary tethering.

U.S. Pat. No. 5,022,351

Inventor: Thomas Daniels

Issued: Jun. 11, 1991

The present invention teaches a portable convertible tethering system which is centered around a retractable leash cartridge. The leash cartridge may be used along to restrain children or animals while moving about, or alternatively, the cartridge may be placed in the system's housing which is attached to an anchoring device thereby becoming an integral part of a stationary tethering device. The housing is sized and shaped specifically for securely holding a portable retractable leash cartridge inside, yet is designed for simple insertion and removal of the cartridge. The housing has a lockable door for holding the leash cartridge inside against force or agitation. The housing is pivotally mounted on the anchor device so that the end of the cartridge from which the leash cord extends may follow that which is tethered; this capability reduces the likelihood that whatever is tethered, particularly an animal such as a dog, will not likely tangle the leash cord around the base of the system's anchor. The system's two-fold use of the retractable leash cartridge provides a user with the most economical avenue for having effective and convenient devices for both mobile and stationary tethering.

U.S. Pat. No. 5,353,747

Inventor: Bob C. Fain

Issued: October 11, 1994

A system for leashing dogs at any one of a plurality of locations comprises a first exterior hollow post having a circular cross-section positioned in the ground with a lower end beneath the ground and an upper end adjacent to ground level; a second interior hollow post slidably received within the exterior post, the interior post being of a length no greater than the length of the exterior post, a carriage bolt slidably received within the interior post having a head of a diameter greater than the external diameter of the interior post; and a coupling component having a large aperture received by the carriage bolt and retained in position between the upper edge of the interior post and the head of the carriage bolt. The coupling component also includes a small aperture and an associated chain link. The chain link has screw threads at its opposed ends with a threaded exterior member adapted to be rotated to expose and close an opening between the link ends there adjacent. A leash is coupled between the chain link and a clip adapted to be secured to the collar of a dog.

U.S. Pat. No. 5,526,774

Inventor: Russell M. Swindall, Jr. et al.

Issued: Jun. 18, 1996

A pet stake for insertion vertically into the ground with the upper end of the stake having a leash connected thereto to enable a pet, such as a dog, to move in an unrestricted manner within the length parameters of the leash and then be subjected to a gentle but increasing resilient resistance to movement away from the stake due to the resilient characteristics of the stake. The stake includes a base with a corkscrew and handle by which the base can be screwed into the ground surface with the handle serving to stabilize the base and flexible fiberglass resilient reinforced rod connected with the base. The upper end of the rod includes a spring and swivel eyelet to enable resisted movement of the dog or pet in any direction.

While these pet tether devices may be suitable for the purposes for which they were designed, they would not be as suitable for the purposes of the present invention, as hereinafter described.

SUMMARY OF THE PRESENT INVENTION

A primary object of the present invention is to provide a rotating system for retractable leashes.

Another object of the present invention is to provide a tether device that will allow a 360 degree movement to a pets tether device.

Yet another object of the present invention is to provide a device for retractable leashes allowing for leashing an animal at any one of a plurality of locations.

Still yet another object of the present invention is to provide a carousel device consisting of two pipes, an outer pipe and an inner pipe.

Yet another object of the present invention is to provide a carousel device consisting of two pipes that fit together and may be inserted into the ground.

Additional objects of the present invention will appear as the description proceeds.

The present invention overcomes the shortcomings of the prior art by providing a highly adaptable tethering device that rotates 360 degrees and allows a pet a 360-degree movement.

The device of the present invention is a pet carousel providing a rotating system for retractable leashes. The device allows for leashing an animal at any one of a plurality of locations.

The pet carousel of the present invention includes two pipes, an outer pipe and an inner pipe. The outer pipe is crimped at one end for easy entry into the ground. At the other end of the outer pipe is a spot-welded, generally collar-shaped steel hollow stop that prevents damage from occurring to the outer pipe when hammered into the ground.

The carousel portion consists of a piece of sheet metal that is wrapped and welded around the bottom of an approximately six-inch length of pipe. The sheet metal has four holes to receive a U-shaped key or pin that will hold the retractable leash in place.

The inner pipe has a collar-shaped shoulder held in place by a through pin. The carousel rotates on the shoulder.

At the top of the device is a hammering pin. The hammering pin fits into the top portion of the carousel and is used when installing the outer pipe into the ground.

The pet carousel is light and small enough to take anywhere. It is easy to set up and take down and keeps the pet's leash untangled and allows 360-degree movement.

An apparatus for securing a pet leash having a grip is provided, the apparatus comprising: a pole, the pole having a first end for insertion into the ground, and a second end extending from the ground; a carousel member, the carousel member being attached to, and rotatable on, the pole proximate the pole second end; the carousel having a first and second extension, the first and second extensions being spaced to receive the pet leash grip; and an insertion member, the insertion member being positionable through the pet leash grip, and through and between the first and second carousel extensions, such that the pet leash is secured to the carousel first and second extensions.

In another embodiment, each of the first and second carousel extensions further comprises a pair of holes, each hole on the first carousel extension being substantially aligned with one of the second carousel extensions, the insertion member further comprising a U-shaped member having two elongated ends, each of the elongated ends being sized for insertion through one of the aligned carousel extension hole pairs with intervening insertion through the pet leash grip.

In another embodiment, the apparatus further comprising a pair of securement members, each securement member being attachable to one of the elongated ends after insertion such that removal of the elongated end from the carousel hole pair is prevented.

In another embodiment, at least part of at least one of the elongated ends is temporarily deformable after insertion such that removal of the deformed elongated end from the carousel hole pair is prevented.

In another embodiment, the at least one deformable elongated end further has a hole, the hole being sized to receive a padlock.

In another embodiment, the pole further comprises a first and second portion, the first and second pole portions being telescoped.

In another embodiment, the pole second portion has a spreadable collar sized for close receipt by and within the pole first portion, the spreadable collar being movable along the length of the pole first portion, the spreadable collar being lockable within and with respect to the pole first portion such that the length of the combined pole first and second portions is adjustable.

In another embodiment, the pole first and second portions are adjustably telescoped such that the pole length is adjustable.

In another embodiment, the pole first and second portions are threadably telescoped such that the pole length is adjustable by rotating the pole first portion with respect to the second portion.

In another embodiment, the pole first portion has a first end shaped for hammered insertion into the ground, and a second end having a protective member for receiving hammer blows prior to the insertion of the pole second portion into the pole first portion.

In another embodiment, the pole second end has an exterior protrusion and the carousel further has a hollow portion, the hollow portion being sized to receive the pole second end and to rotate on the pole second end, the hollow portion being positioned on the pole second end exterior protrusion.

In another embodiment, the pole second end exterior protrusion is a collar.

In another embodiment, the apparatus further comprises a hammer pin, the hammer pin being attachable to the carousel hollow portion, the hammer pin having a generally planar hammering surface.

In another embodiment, the pole first end is shaped for hammered insertion into the ground.

In another embodiment, the apparatus further comprises a hammer pin, the hammer pin being attachable to the pole second end, the hammer pin having a generally planar hammering surface.

In another embodiment, the pole first end is crimped such that the pole first end may be inserted into the ground by hammering.

In another embodiment, the apparatus of further comprises a hammer pin, the hammer pin being attachable to the pole second end, the hammer pin having a generally planar hammering surface.

In another embodiment, each of the first and second carousel extensions further comprise an opening for receiving the insertion member, the insertion member having a pair of holes, and the apparatus further comprises a pair of pins for insertion into the insertion member holes, the pins being sized to prevent the removal of the insertion member form the first and second carousel extension openings.

In another embodiment, each of the first and second carousel extensions further comprise an opening for receiving the insertion member, the insertion member having a pair of holes, and the apparatus further comprises a insertion member pin having two elongated ends, each of the elongated ends being sized for insert into the insertion member holes, the elongated ends being sized to prevent the removal of the insertion member form the first and second carousel extension openings.

An apparatus for securing a pet leash having a grip is provided, the apparatus comprising: a pole, the pole having a first end for insertion into the ground, and a second end extending from the ground; carousel means, the carousel means being attached to, and rotatable on, the pole proximate the pole second end; and means for securing the pet leash grip within the carousel means.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 4:
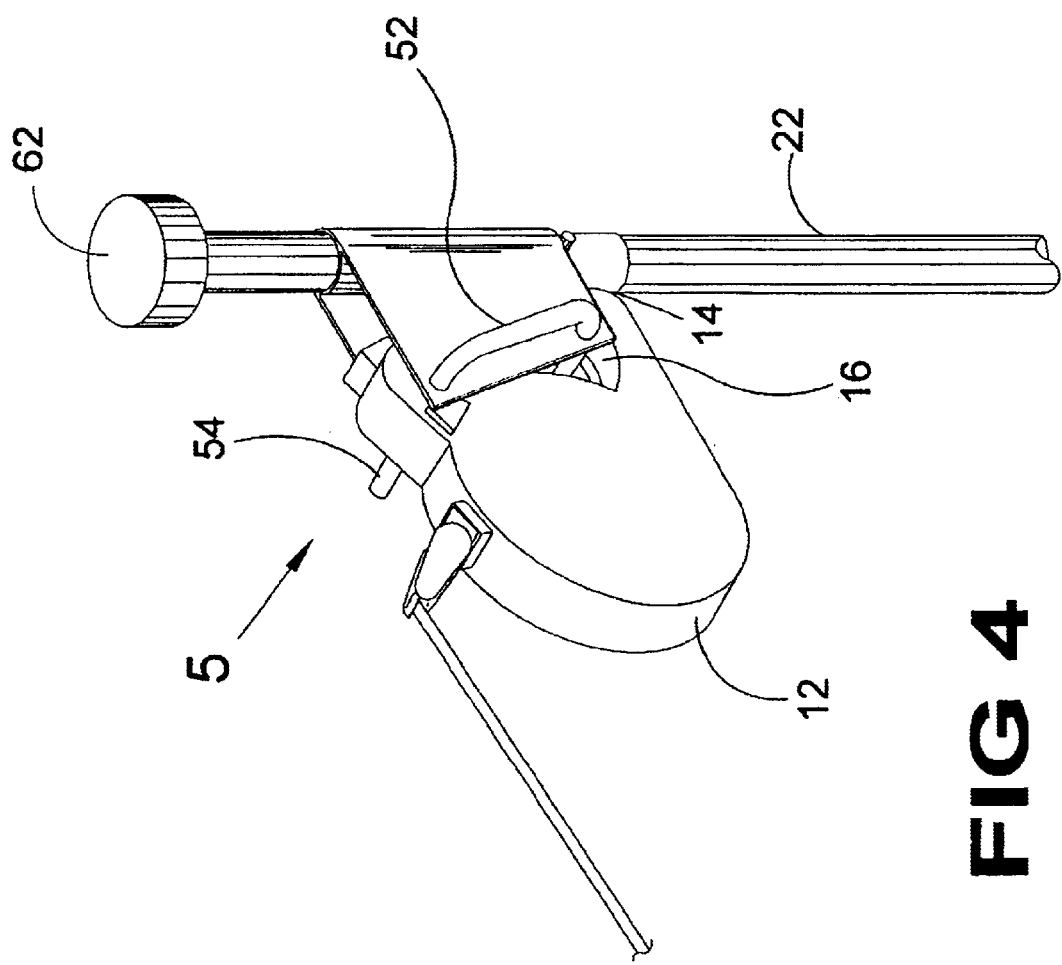

FIG. 4 is a perspective view of the carousel portion and partial portion of the inner pipe. Shown is a retractable leash inserted into the extended portion of the carousel and locked in by a key pin. The carousel portion of the device rotates on a stop pin located on the inner pipe.

Figure 5:
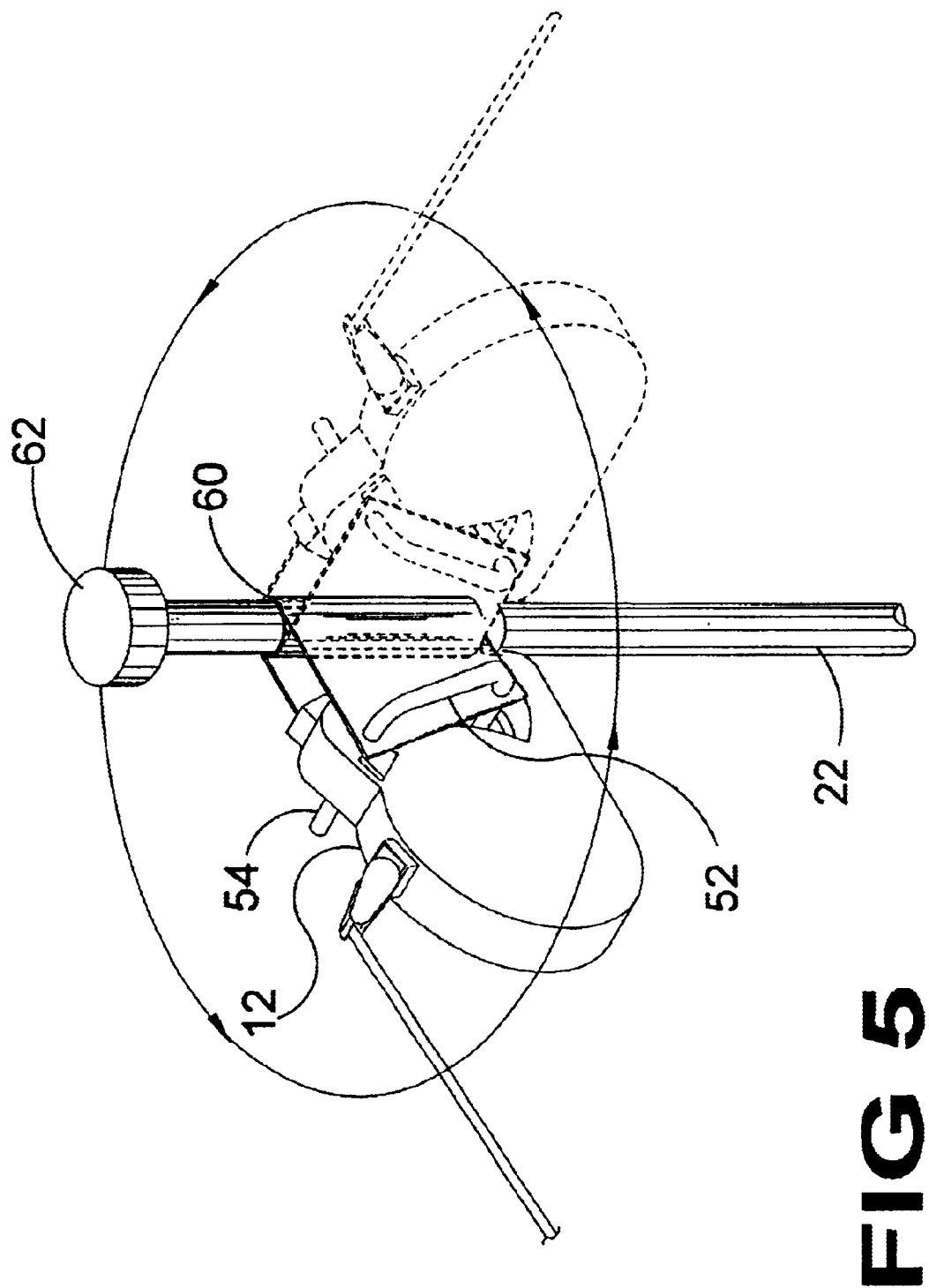

FIG. 5 is a perspective view of the carousel showing the carousel rotating on the inner pipe and the stop pin.

Figure 6:
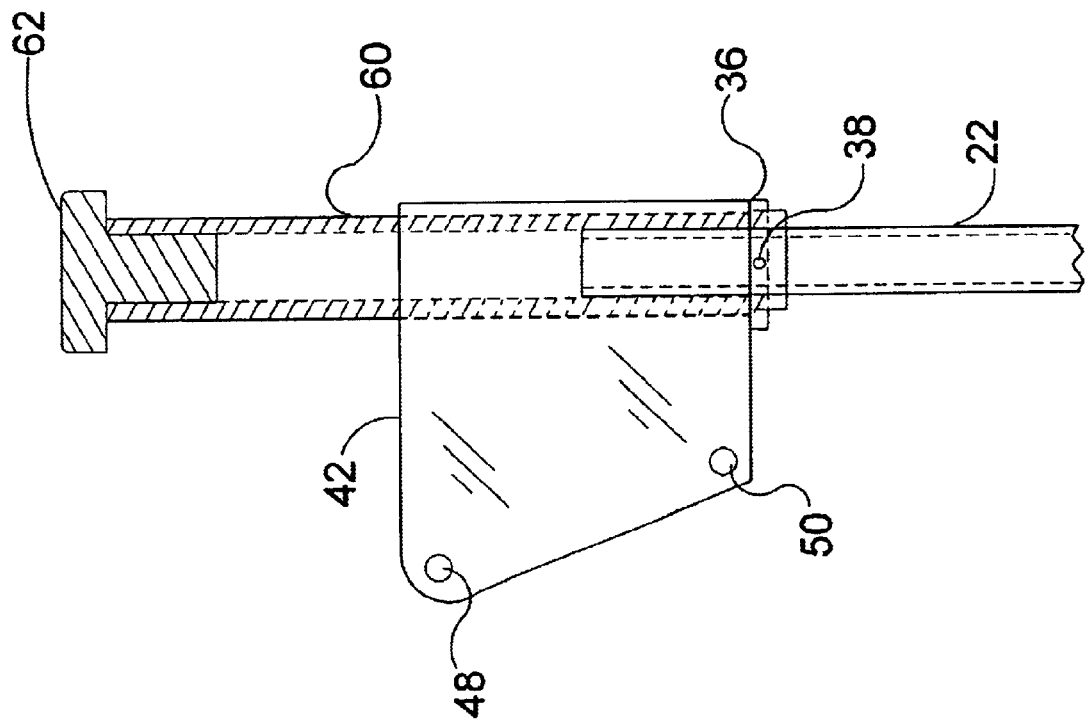

FIG. 6 is side sectional view of the top portion of the carousel of the present invention.

Figure 7:
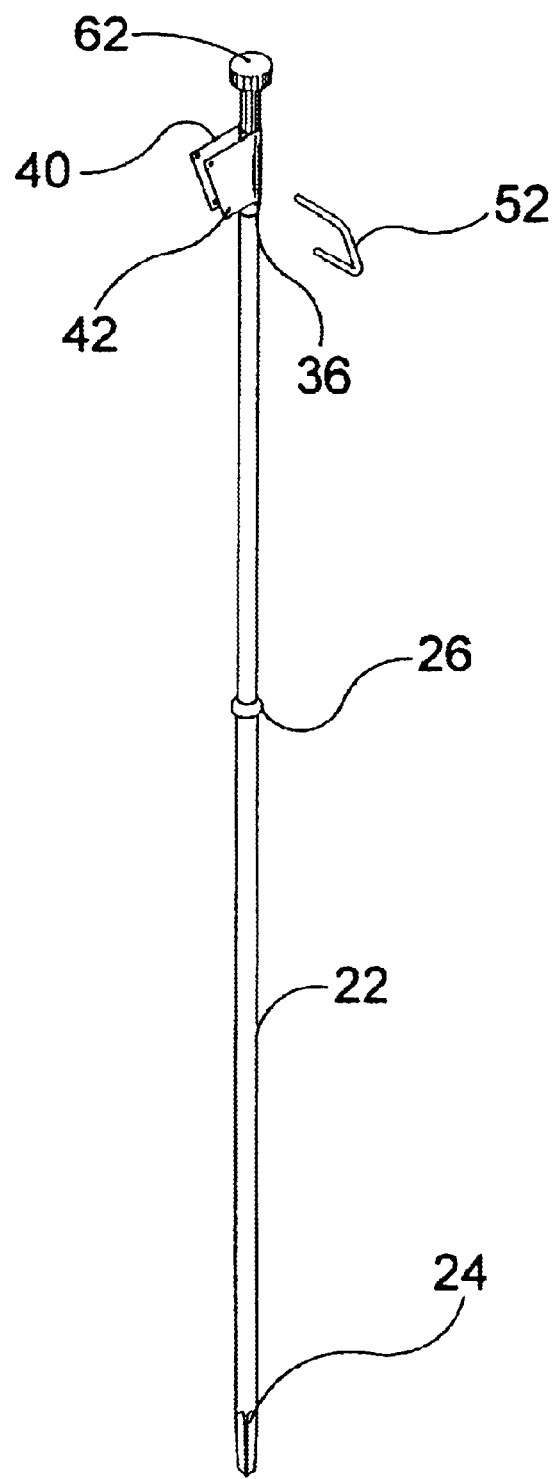

FIG. 7 is a perspective view of the present invention, showing all parts assembled.

Figure 8:
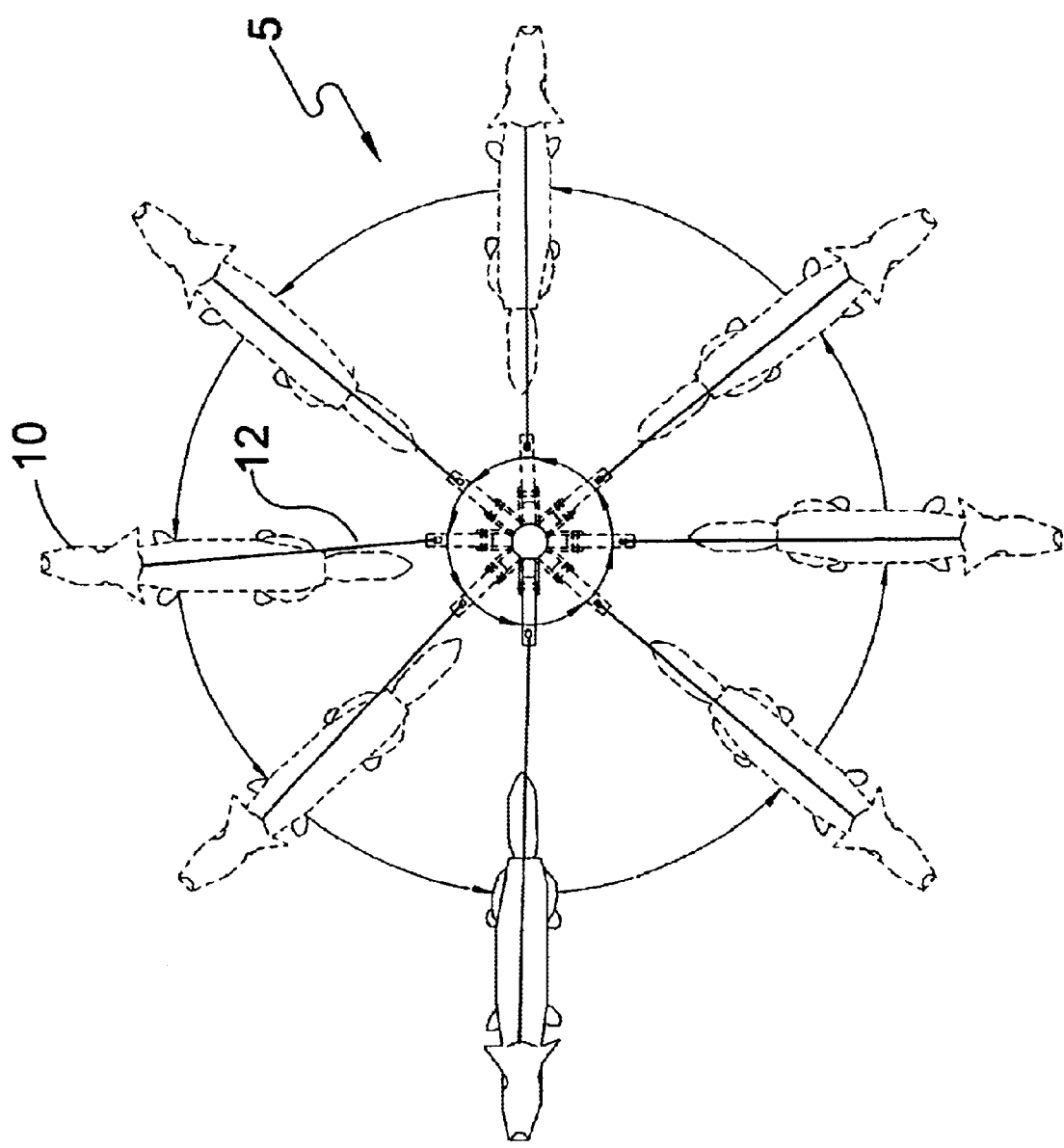

FIG. 8 is a top view of the present invention showing a pet attached to its tether and the carousel device of the present invention and the 360 degree movement the carousel provides.

Figure 9:
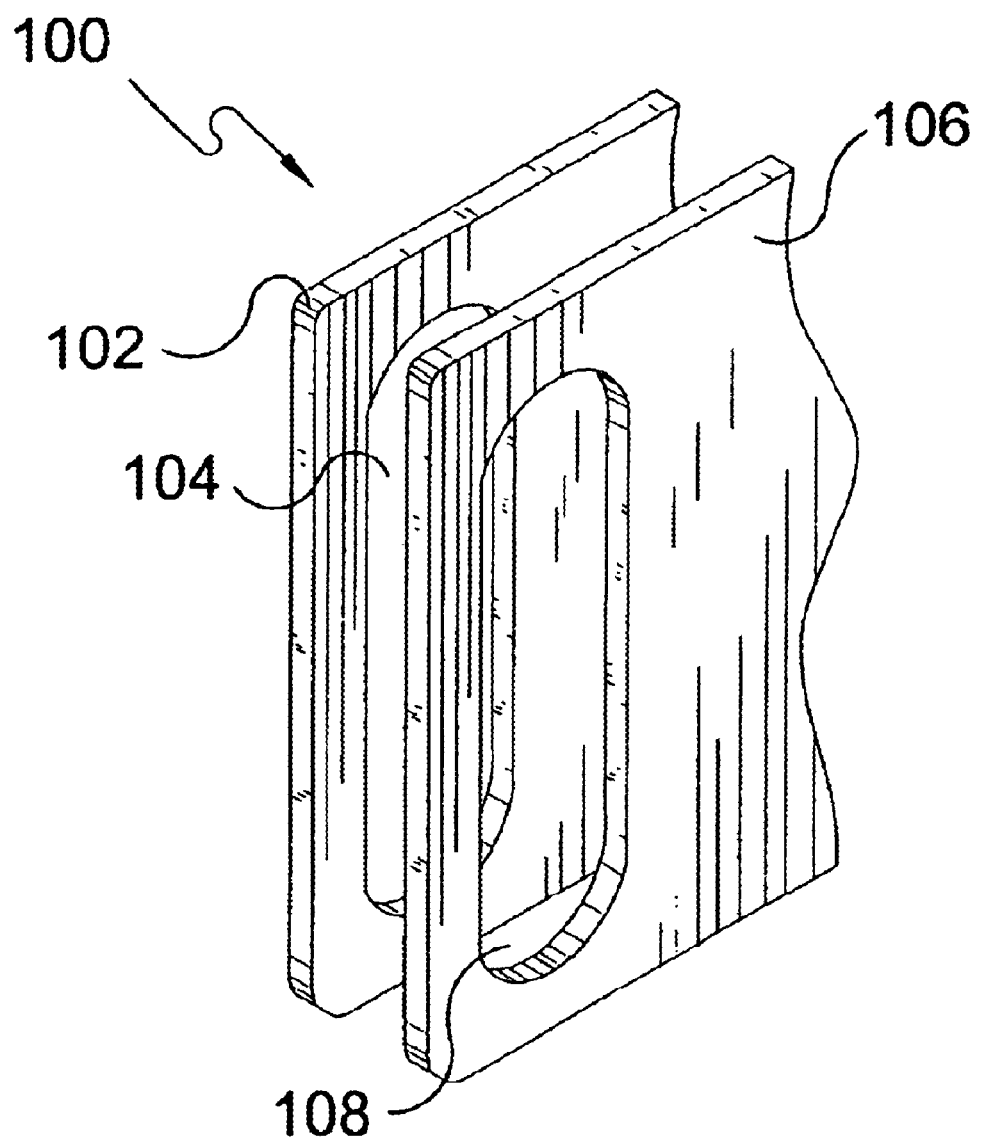

FIG. 9 is partial perspective showing an alternate embodiment of the carousel extensions.

Figure 10:
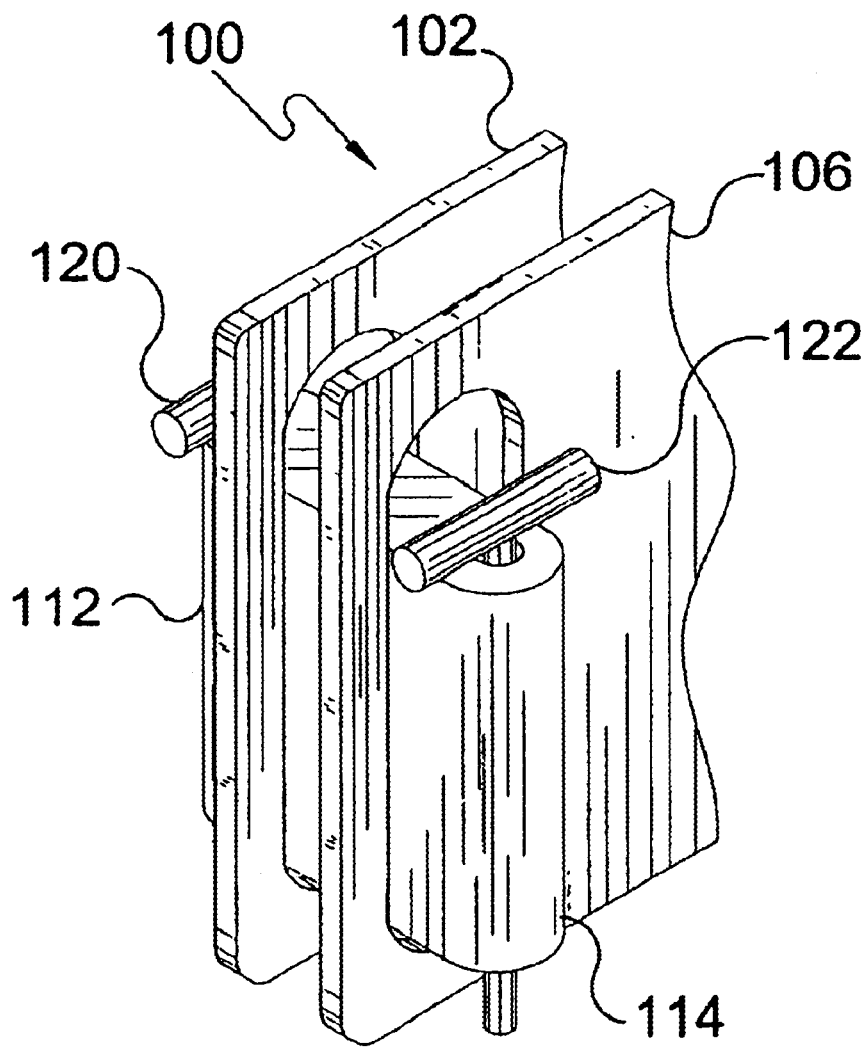

FIG. 10 is partial perspective showing an alternate embodiment of the carousel extensions with an alternate leash retaining member shown.

Figure 11:
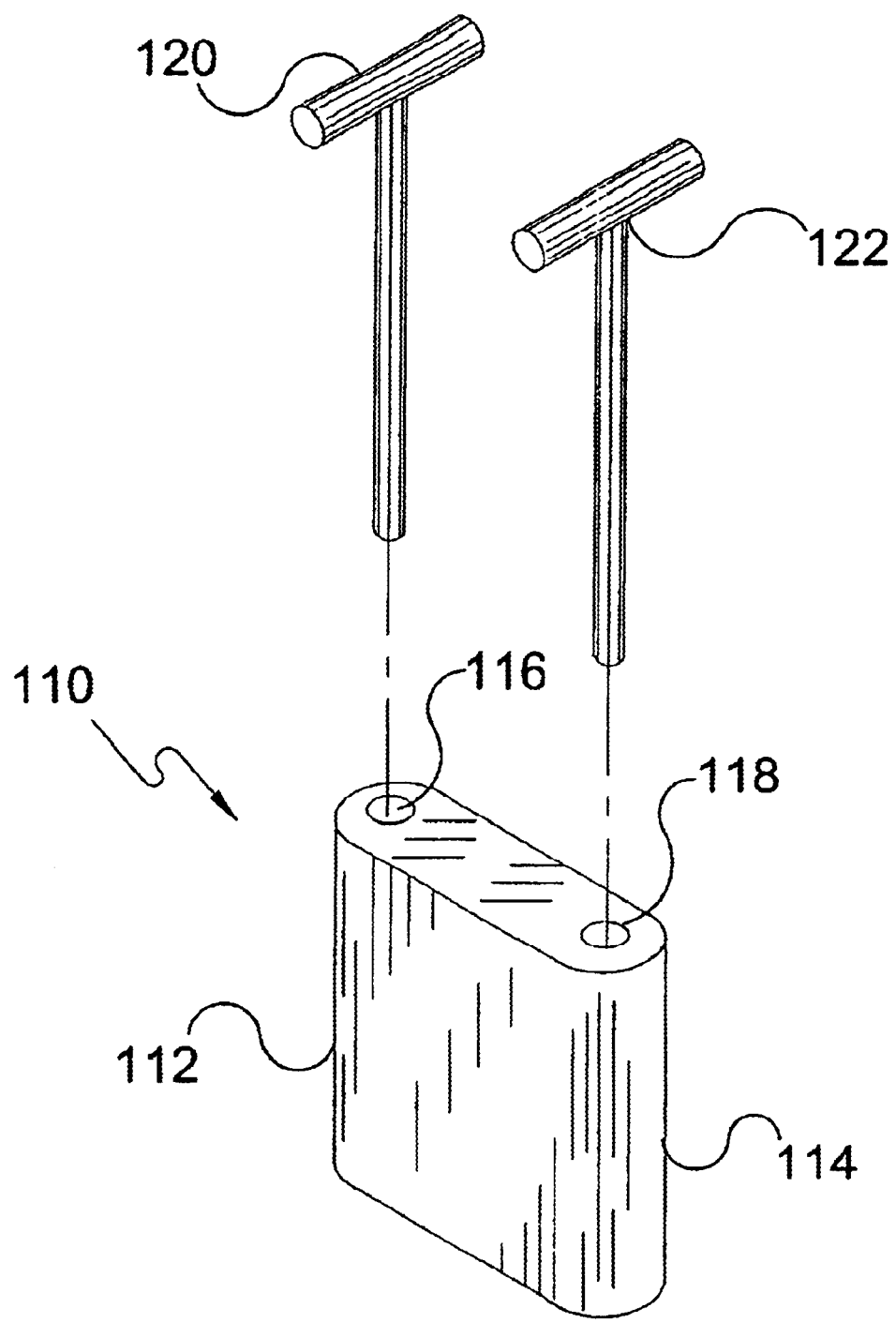

FIG. 11 is a perspective view showing an alternate embodiment of the retaining member with a first type of retaining pin.

Figure 12:
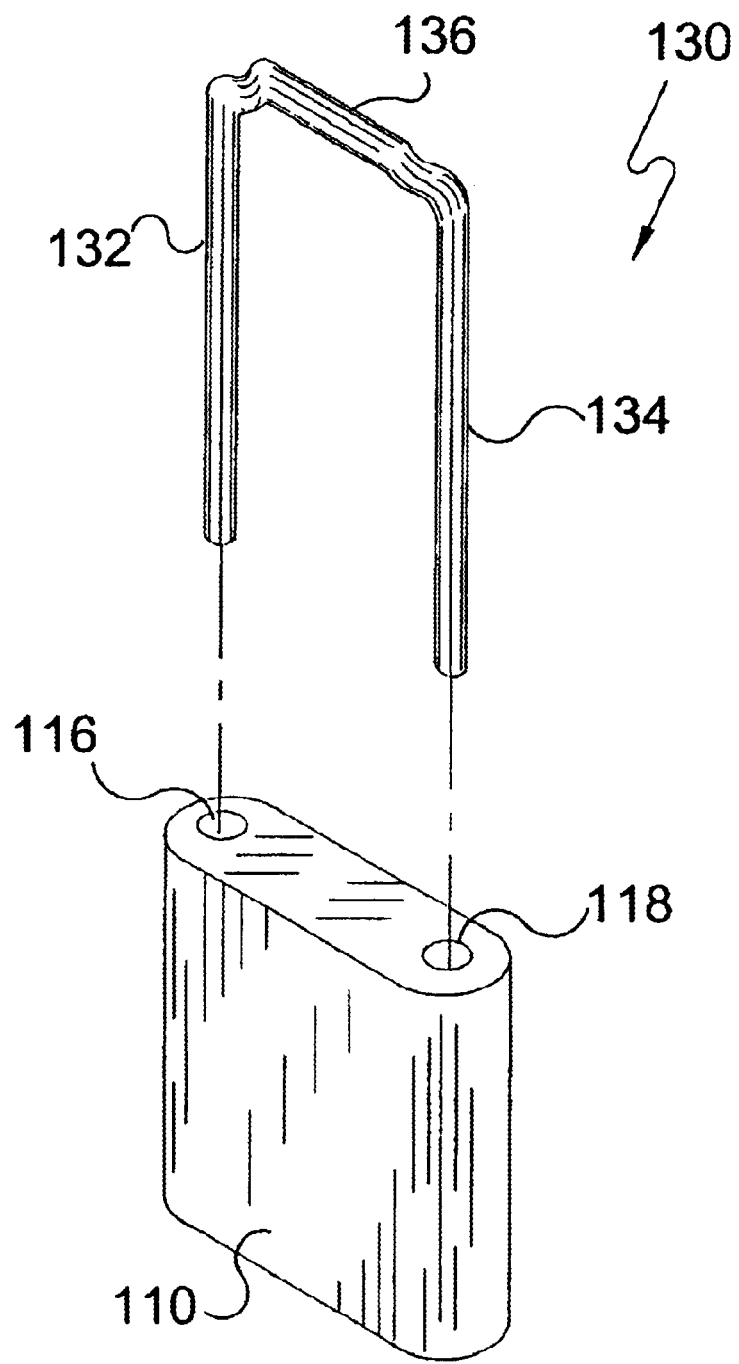

FIG. 12 is a perspective view showing an alternate embodiment of the retaining member with a second type of retaining pin.

Figure 13:
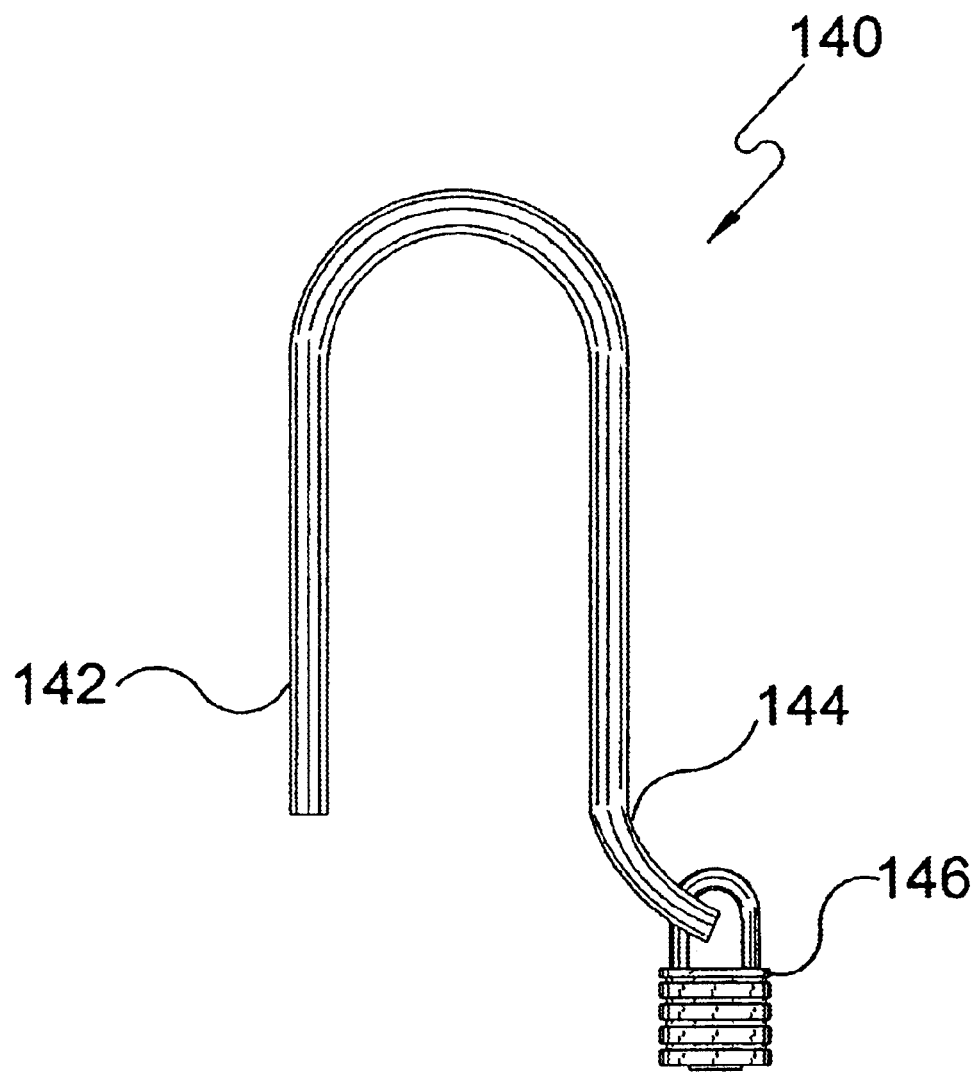

FIG. 13 is an alternate retaining pin having a deformable pin member.

DETAILED DESCRIPTION OF THE PREFERRED EMBODIMENTS

Turning now descriptively to the drawings, in which similar reference characters denote similar elements throughout the several views, FIGS. 1–13 illustrate the Pet Carousel of the present invention indicated generally by the numeral 5.

Figure 1:
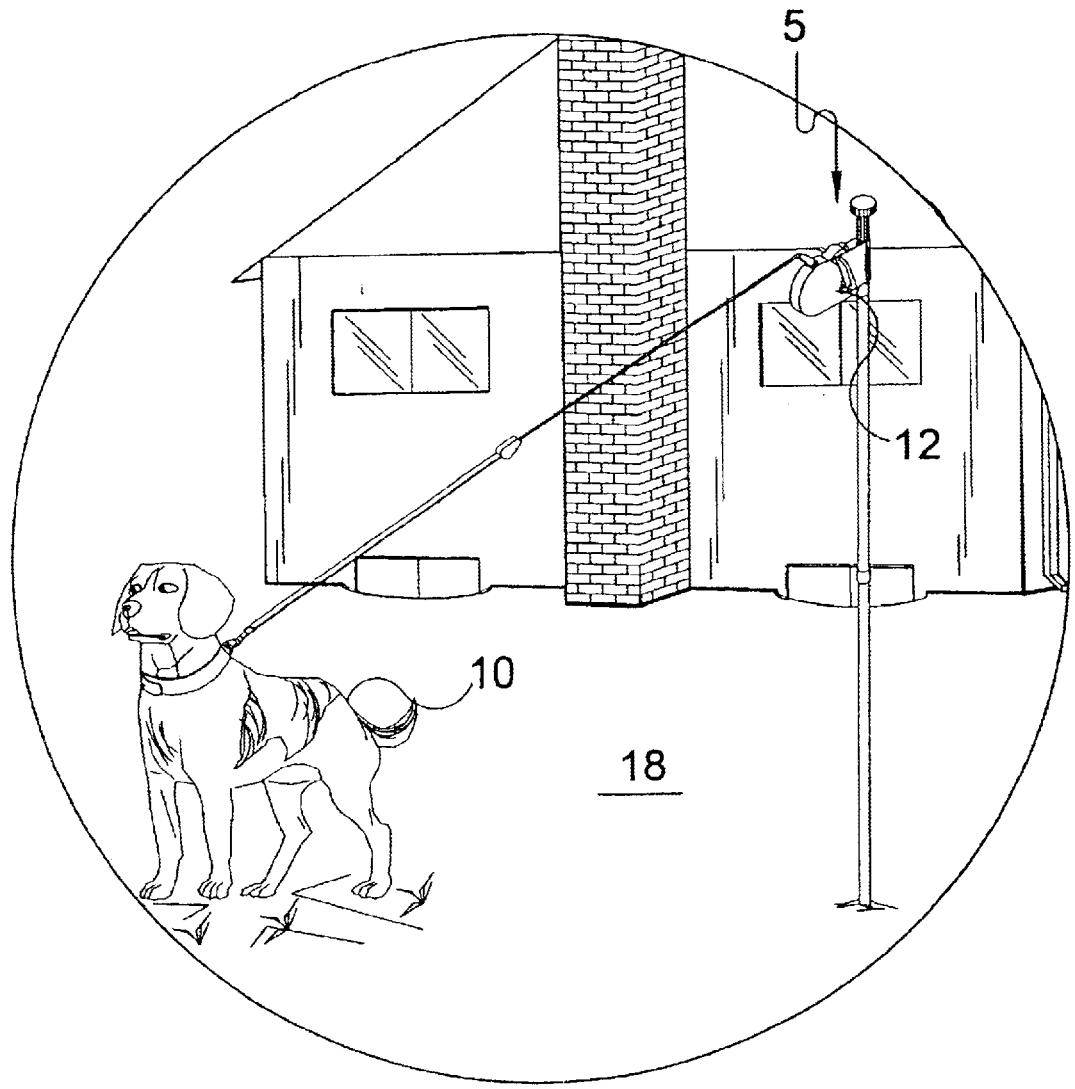
FIG. 1 is a pictorial illustration of the device of the present invention in use.

The device 5 is shown generally in FIGS. 1–13, and in use in FIGS. 1 and 8. The device 5 is used to tether pets 10 using a typical retractable pet leash 12, of the type having a grip 14, the grip forming an opening 16. In a typical application the device 5 is inserted into the ground surface 18 with the pet leash 12 attached at the top.

Figure 2:
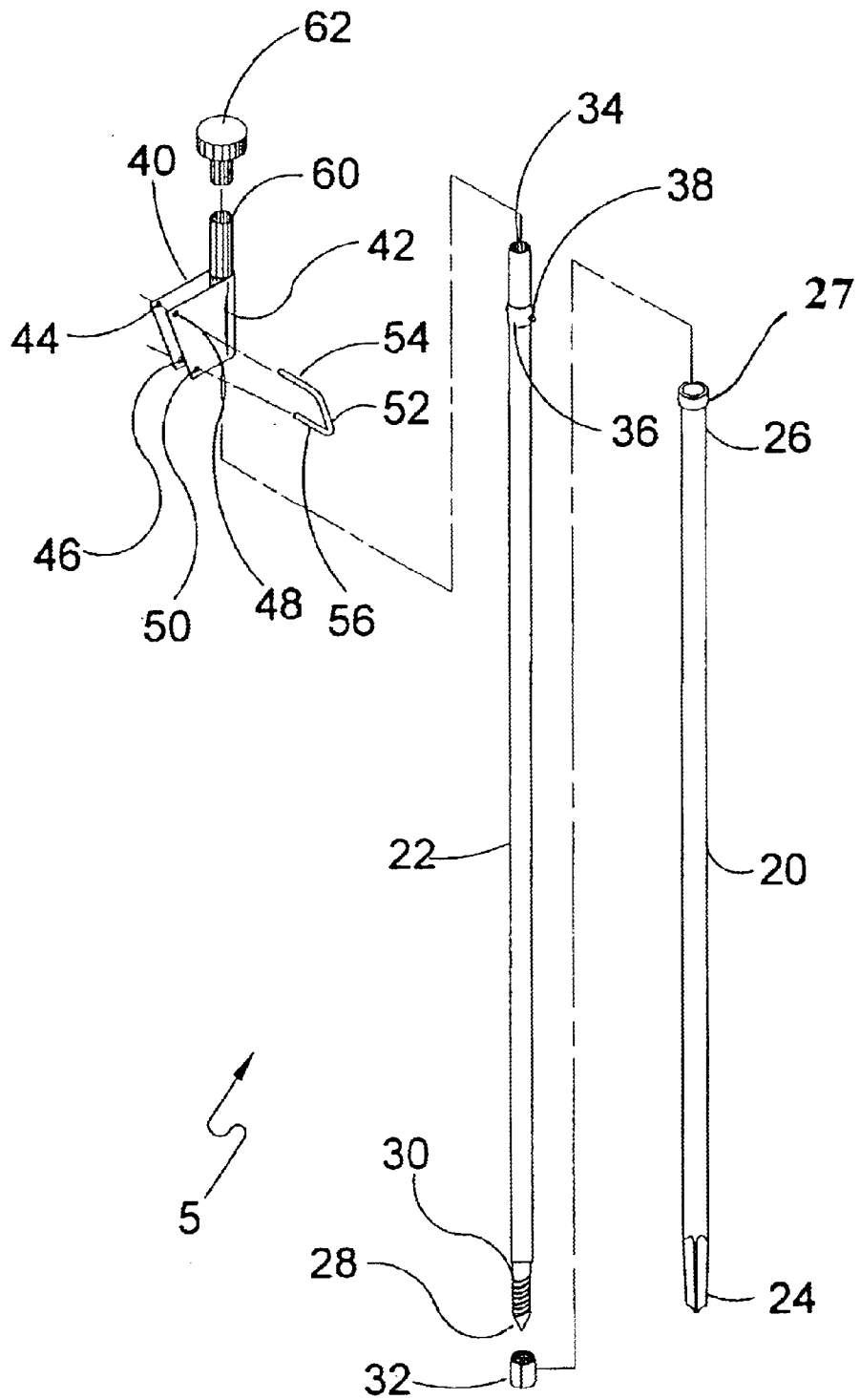
FIG. 2 is a perspective view of the device of the present invention showing all parts in an exploded state.

As shown in FIG. 2, the device 5 has an outer pipe 20 and an inner pipe 22 telescoped therein. The outer pipe 20 has a first end 24 that is crimped, or otherwise shaped, for hammered insertion into a ground surface 18, such as a lawn. The outer pipe 20 has a second end 26 that snugly receives a split collar 32 threadably attached in a first position to the first end 28 of the inner pipe 22, utilizing inner pipe tapered first end threads 30. By inserting the split collar 32 into the outer pipe second end 26 to the desired position, and then screwing the inner pipe first end 28 into the split collar 32, the split collar 32 spreads in this second position to lock against the interior of the outer pipe 20. By alternately twisting the inner pipe 22, the split collar 32 moves between a first and second position on the inner pipe first end threads 30, allowing the split-collar 32 to be positioned at various positions within the outer pipe 20. Such positioning allows an adjustable length of the combined inner pipe 22 and outer pipe 20 assembly, and provides an adjustable height for the inner pipe second end 34.

Also attached to the outer pipe second end 26 is a collar-shaped protective member 27 for the user who chooses to hammer the outer pipe 20 into the ground surface 18 prior to insertion of the inner pipe 22.

As shown in FIGS. 2–6, and in FIG. 6 in particular, a carousel rotation member 60 is received upon the inner pipe second end 34 and rests upon the shoulder presented by the inner pipe collar 36. When so positioned, the rotation member 60 is free to rotate about the inner pipe second end 34, as shown in FIG. 5.

A portion of sheet metal is wrapped and shaped about the rotation member 60 to present a carousel first extension 40 and second extension 42. The carousel first extension 40 has a top hole 44 and bottom hole 46. The carousel second extension 42 also has a top hole 48, aligned with first extension top hole 44, and a bottom hole 50, aligned with first extension bottom hole 46. A U-shaped pin 52 has a top member 54 sized for insertion into extension top holes 44,48, and a bottom member 56 sized for insertion into extension bottom holes 46,50.

Figure 3:
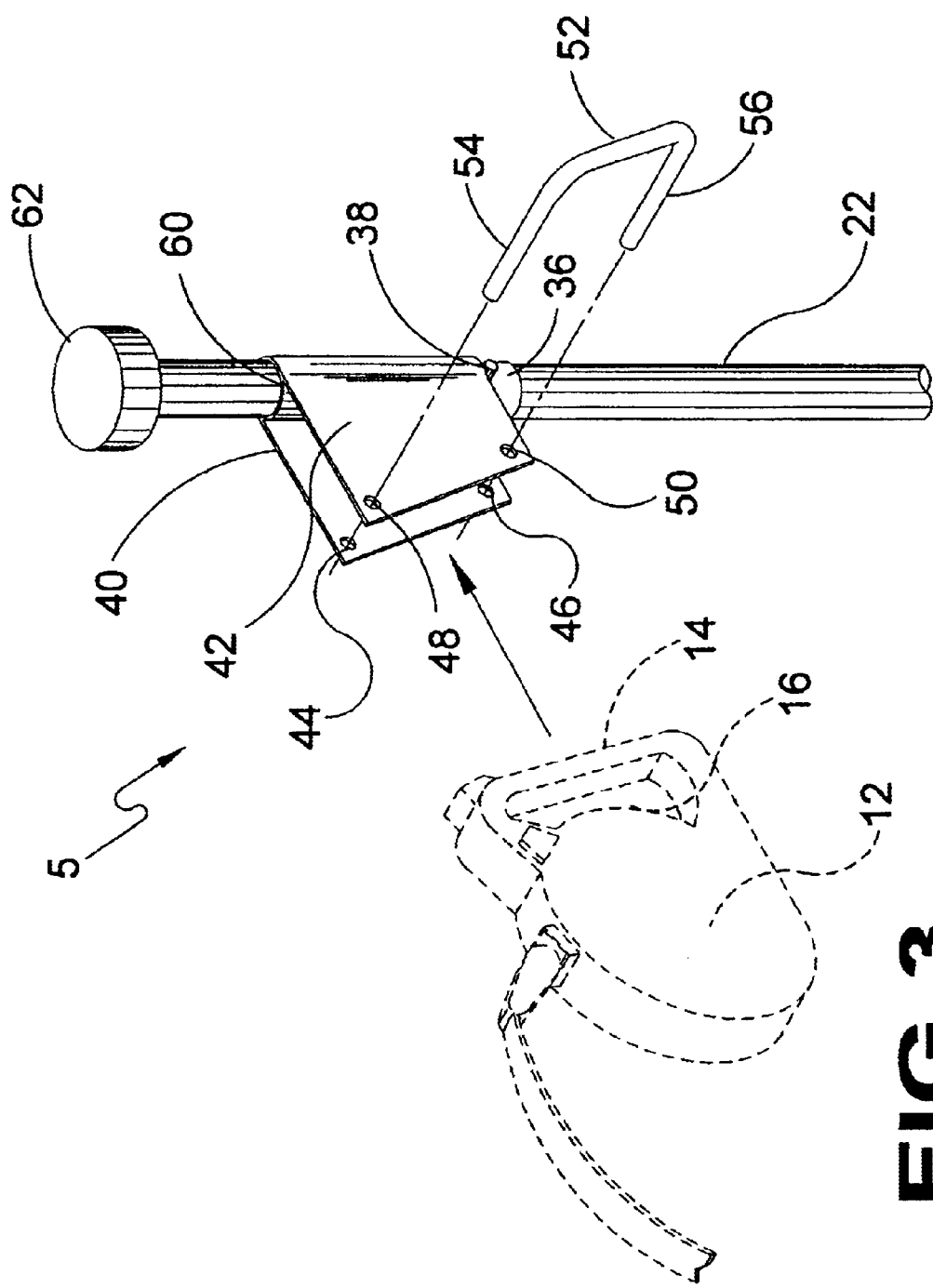
FIG. 3 is a perspective view of the present invention showing the carousel portion and partial portion of the inner pipe as a retractable leash may be inserted into the extended portion of the device.

As shown in FIG. 3, carousel first and second extensions 40,42 are spaced to closely receive the grip 14 of a typical retractable pet leash 12. When so received the opening 16 formed by the grip 14 is aligned with the carousel extension top holes 44,48 and bottom holes 46,50 such that the U-shaped pin members 54,56 is insertable through the extension holes 44,46,48,50 and the leash opening 16. This insertion secures the retractable pet leash 12 to the carousel extensions 40,42.

A hammering pin 62 is insertable into the rotation member 60 to provide an impact distribution surface for hammering the assembled inner and outer pipes 22,20 into the ground surface 18, thus avoiding damage to the rotation member 60.

The owner of the pet 10 can easily disassemble and transport the pet carousel 5 for re-assembly at another location. Upon arrival the inner and outer pipes 20,22 are attached and adjusted and the rotation member 60 is slipped over the inner pipe second end 34. The hammering pin 62 is then inserted into the rotation member 60, and the assembled inner and outer pipes 22,20 are driven into the ground surface 18 using a typical hammer.

Once the outer pipe 20 has penetrated to a depth providing the optimum height for the assembly 5, the retractable pet leash 12 is inserted, grip 14 first, such that the U-shaped pin members 54,56 can be inserted into the top and bottom holes 44,46 of the carousel first extension 40, through the pet leash grip opening 16, and then through the top and bottom holes 48,50 of the carousel second extension 42. With the pet leash 12 securely retained by the U-shaped pin 52 between the carousel first and second extensions 40,42, the owner can then spool the desired amount of leash material from the retractable pet leash 12 and attach the same to the collar of the pet 10.

The rotatability of the carousel rotation member 60, allows the leashed pet 10 to completely encircle the assembly 5 in any direction. Because the carousel first and second extensions 40,42 spaces the retractable pet leash 12 from the inner pole 22, and also directs the leash spool-out away from the assembly 5, the assembly 5 minimizes any binding, wrapping or tangling of the leash material.

In another embodiment, the inner pipe and outer pipe are combined in one piece.

In an embodiment 100 shown in FIGS. 9–11, the carousel first and second extensions 102 and 106 have opposed openings 104,108, into which is inserted a carousel retaining member 110. This alternate to the U-shaped pin 52, has a first end 112 with a vertically oriented hole 116, and a second end 114 with a similar vertically oriented hole 118. Pins 120,122 are closely received by the holes 116,118. With this retaining member 110, the user inserts the retractable pet leash grip 12 between the carousel first and second extensions 102,106. The retaining member 110 is then inserted through carousel second extension opening 108, through the pet leash grip opening 16 and then through carousel first extension opening 104. Pins 120,122 are then inserted into retaining member holes 116,118. Since the pins 120,122 are longer than carousel extension openings 104,108, the retaining member 110 is fixed and the retractable pet leash 12 is again secured.

As an alternative to the pins 120,122, a combined pin 130 can be used to secure the retaining member 110. The combined pin 130 has pin members 132,134 that are inserted in the same manner as pins 120,122, however, as shown in FIG. 12, the pin members 132,134 are joined by an arched member 136, the arch being provided to clear any protrusion of the pet leash grip 16 above the tops of carousel first and second extensions 102,106.

As shown in FIG. 13, a special U-shaped pin 140 is provided that has pin members 142,144. Pin member 144 is deformable such that its end is bent to prevent inadvertent dislodging of the U-shaped pin 140. Either or both of the pin members 142,144 can be deformable to achieve this goal as well as, the pin members 54,56, 120,122,132,134 in the various described embodiments 5,100. Similarly, such pin members 54,56, 120,122,132,134 can include a hole for a padlock 146.

Although sheet metal is described for certain components, various metals, woods and plastics may be used for those components and other components as well. All such choices are in accordance with the present invention, and as determined by the intended end use for the embodiments of the overall device 5 as will occur to those of skill in the art upon review of the present disclosure.

It will be understood that each of the elements described above, or two or more together may also find a useful application in other applications differing from that described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An apparatus for securing a pet leash having a grip with an opening, the apparatus comprising:

a pole, the pole having a first end for insertion into the ground, and a second end extending from the ground;

a carousel mounted and rotatable on the pole proximate the pole second end;

said carousel comprising a cylinder sized to slide over the second end of said pole and a U-shaped member comprising a sheet metal folded over and attached to said cylinder with first and second extensions forming sides of said U-shaped member, said first and second extensions being parallel to each other, extending beyond the diameter of said pole, and spaced a sufficient distance to receive the pet leash grip;

said pole having a stop pin to maintain said carousel adjacent the second end of said pole; and said pet leash grip located between said first and second extensions;

aligned openings in said first and second extensions;

means inserted through said openings and the opening in said pet leash grip to retain said grip in said carousel.

2. The apparatus of claim 1, wherein said inserted means comprises a pair of securement members.

3. The apparatus of claim 1, wherein the pole further comprises a first and second portion, the first and second pole portions being telescoped.

4. The apparatus of claim 3, wherein the pole second portion has a spreadable collar sized for close receipt by and within the pole first portion, the spreadable collar being movable along the length of the pole first portion, the spreadable collar being lockable within and with respect to the pole first portion such that the length of the combined pole first and second portions is adjustable.

5. The apparatus of claim 3, wherein the pole first and second portions are adjustably telescoped such that the pole length is adjustable.

6. The apparatus of claim 3, wherein the pole first and second portions are threadably telescoped such that the pole length is adjustable by rotating the pole first portion with respect to the second portion.

7. The apparatus of claim 3, wherein the pole first portion has a first end shaped for hammered insertion into the ground, and a second end having a protective member for receiving hammer blows prior to the insertion of the pole second portion into the pole first portion.

8. The apparatus of claim 1, wherein said cylinder extends above the pole second end.

9. The apparatus of claim 8, further comprising a hammer pin, the hammer pin being inserted into a top opening of said cylinder, the hammer pin having a generally planar hammering surface.

10. The apparatus of claim 1, wherein the pole first end is shaped for hammered insertion into the ground.

11. The apparatus of claim 1, wherein the pole first end is crimped such that the pole first end may be inserted into the ground by hammering.

12. The apparatus of claim 11, further comprising a hammer pin, the hammer pin being attachable to the pole second end, the hammer pin having a generally planar hammering surface.

* * * * *